US011645285B2

(12) United States Patent
Gillespie et al.

(10) Patent No.: US 11,645,285 B2
(45) Date of Patent: May 9, 2023

(54) QUERY ENGINE FOR RECURSIVE SEARCHES IN A SELF-DESCRIBING DATA SYSTEM

(71) Applicant: ARAS CORPORATION, Andover, MA (US)

(72) Inventors: Kevin Gillespie, Andover, MA (US); Kevin Richard, Andover, MA (US); Robert McAveney, Boxford, MA (US); Sergey Murashko, Minsk (BY); Valentsin Shapavalau, Minsk (BY); Andrei Samsonau, Minsk (BY)

(73) Assignee: ARAS CORPORATION, Andover, MA (US)

( * ) Notice: Subject to any disclaimer, the term of this patent is extended or adjusted under 35 U.S.C. 154(b) by 0 days.

(21) Appl. No.: 16/387,205

(22) Filed: Apr. 17, 2019

(65) Prior Publication Data

US 2019/0332600 A1 Oct. 31, 2019

Related U.S. Application Data

(60) Provisional application No. 62/663,777, filed on Apr. 27, 2018.

(51) Int. Cl.

| | |
|---|---|
| ***G06F 16/2455*** | (2019.01) |
| ***G06F 16/242*** | (2019.01) |
| ***G06F 16/248*** | (2019.01) |
| ***G06F 16/26*** | (2019.01) |

(52) U.S. Cl.

CPC ...... *G06F 16/24566* (2019.01); *G06F 16/248* (2019.01); *G06F 16/2423* (2019.01); *G06F 16/2448* (2019.01); *G06F 16/26* (2019.01)

(58) Field of Classification Search

CPC ................................................ G06F 16/24566

See application file for complete search history.

(56) References Cited

U.S. PATENT DOCUMENTS

| | | | | |
|---|---|---|---|---|
| 7,013,306 | B1 * | 3/2006 | Turba | G06F 16/86 |
| 7,089,530 | B1 | 8/2006 | Dardinski et al. | |
| 8,375,014 | B1 * | 2/2013 | Brocato | G06F 16/213 707/705 |
| 9,418,111 | B1 * | 8/2016 | de Moor | G06F 16/24566 |
| 2003/0167401 | A1 * | 9/2003 | Murren | G06F 21/6218 726/1 |
| 2006/0069717 | A1 | 3/2006 | Mamou et al. | |
| 2006/0206866 | A1 | 9/2006 | Eldrige et al. | |
| 2006/0259449 | A1 * | 11/2006 | Betz | G06F 16/242 |

(Continued)

*Primary Examiner* — Dawaune A Conyers

(74) *Attorney, Agent, or Firm* — Dickinson Wright PLLC; Stephen A. Mason; Jonathan H. Harder

(57) ABSTRACT

A method for performing recursive searching of items of a data structure having a data mode includes creating an instance of a query definition, the instance of the query definition comprising a unique identifier, specifying one or more elements of the query definition, providing the query definition as an input to a query engine. The method further includes the operations of determining, by the query engine, query execution instructions based on the query definition, the query instructions specifying a recursive level-by-level search until a terminal node of the data structure is reached, obtaining results of a query executed based on the query execution instructions; and outputting query results.

20 Claims, 19 Drawing Sheets

(56) References Cited

U.S. PATENT DOCUMENTS

| | | | | |
|---|---|---|---|---|
| 2007/0271227 | A1* | 11/2007 | Momen-Pour | G06F 16/283 |
| 2013/0060733 | A1* | 3/2013 | Wu | G06F 16/24<br>707/609 |
| 2014/0101133 | A1* | 4/2014 | Carston | G06F 16/24545<br>707/718 |
| 2014/0280314 | A1* | 9/2014 | Coleman | G06F 16/28<br>707/769 |
| 2015/0261728 | A1* | 9/2015 | Davis | G06F 16/93<br>715/234 |
| 2017/0351683 | A1 | 12/2017 | Hurst et al. | |

* cited by examiner

<Item type = “Part” id=”ABCDEF012345" action=”get”/>

```
<Item type="Part" action="add">
  <item_number>999-888</item_number>
  <description>Some Assy</description>
  <Relationships>
    <Item type="Part BOM" action="add">
      <quantity>10</quantity>
      <related_id>
        <Item type="Part" action="add">
          <item_number>123-456</item_number>
          <description>1/4w 10% 10K Resistor</description>
         </Item>
      </related_id>
    </Item>
  </Relationships>
</Item>
```

```
   <?xml version="1.0"?>
 - <AML>
   - <Item action="qry_ExecuteQueryDefinition" type="qry_QueryDefinition">
         <root_query_item_ref_id>part_1</root_query_item_ref_id>
         <name>UseCase_1</name>
705    - <Relationships>
           <Item type="qry_QueryCondition">
           - <condition_xml>
                 <!CDATA[<condition> <eq> <property ref-id="TopPart_id_GUID"/> <property ref-
710a            id="PBom_sourceId_GUID"/> </eq> </condition> ]]>
             </condition_xml>
             <ref_id>join_cond_1</ref_id>
           </Item>
         - <Item type="qry_QueryCondition">
           - <condition_xml>
                 <!CDATA[<condition> <eq> <property ref-id="PBom_relatedId_GUID"/> <property ref-
710b            id="RelPart_id_GUID"/> </eq> </condition> ]]>
             </condition_xml>
             <ref_id>join_cond_2</ref_id>
           </Item>
         - <Item type="qry_QueryCondition">
           - <condition_xml>
                 <!CDATA[<condition> <gt> <property ref-id="PBom_quantity_GUID"/>
710c             <constant>5</constant> </gt>  </condition> ]]>
             <condition_xml>
             <ref_id>cond_1</ref_id>
           </Item>
         - <Item type="qry_QueryItem">
             <alias>TopPart</alias>
             <condition_ref_id/>
715a         <item_type type="ItemType" name="Part"
                 keyed_name="Part">4F1AC04A2B484F3ABA4E20DB63808A88</item_type>
             <ref_id>part_1</ref-id>
           - <Relationships>
             - <Item type=" qry_QueryItemSelectProperty">
720a             <property_ref_id>TopPart_id_GUID</property_ref_id>
               </Item>
             - <Item type="qry_QueryItemSelectProprty">
720b             <property_ref_id>TopPart_itemNumber_GUID</property_ref_id>
               </Item>
             - <Item type="qry_QueryItemSelectProperty">
720c             property_ref_id>TopPart_createdById_GUID</property_ref_id>
               </Item>
             - <Item type="qry_QueryItemSortProperty">
                 <property_ref_id>TopPart_name_QUID</property_ref_id>
725              <sort_order>128</sort_order>
                 <sort_order_direction>Ascending</sort_order_direction>
               </Item>
             </Relationships>
```

```
      </Item>
    - <Item type="qry_QueryItem">
          <alias>PBom</alias>
          <condition_ref_id>cond_1</condition_ref_id>
715b      <item_type type="ItemType" name="Part BOM" keyed_name="Part
              BOM" >5E9C5A12CC58413A8670CF4003C57848</item_type>
          <ref_id>part_bom_1</ref_id>
        + <Relationships>
      </Item>
    - <Item type="qry_QueryItem">
          <alias>RelPart</alias>
          <condition_ref_id/>
715c      <item_type type="ItemType" name="Part"
              keyed_name="Part">4F1AC04A2B484F3ABA4E20DB63808A88</item_type>
          <ref_id>part_2</ref_id>
        - <Relationships>
            - <Item type="qry_QueryItemSelectProperty">
                  <property_ref_id>RelPart_itemNumber_GUID</property_ref_id>
720d          </Item>
          <Relationships>
      </Item>
    - <Item type="qry_QueryReferency">
          <child_ref_id>part_bom_1</child_ref_id>
          <condition_ref_id>join_cond_1</condition_ref_id>
730a      <parent_ref_id>part_1</parent_ref_id>
          <ref_id>qref_1<ref_id>
      </Item>
    - <Item type="qry_QueryReferency">
          <child_ref_id>part_2</child_ref_id>
          <condition_ref_id>join_cond_2</condition_ref_id>
730b      <parent_ref_id>part_1</parent_ref_id>
          <ref_id>qref_2<ref_id>
      </Item>
    <Relationships>
  </Item>
<AML>
```

```
<Item type="qry_QueryDefinition" action="qry_ExecuteSimplifiedQueryDefinition">
  <Parameters>
    <parameter name="@PartNumber" type="string" value="IN-00001" />
  </Parameters>
  <Relationships>
    <Item type="Part" qb:alias="Part" qb:select="id, item_number">
      <qb:filter>
        <eq>
          <property qb:alias="Part.item_number" />
          <parameter name="@PartNumber" />
        </eq>
      </qb:filter>
    </Item>
  </Relationships>
</Item>
```

1005 (Parameters block); 1010 (Part BOM Item block)

```
<Item type="qry_QueryDefinition"
action="qry_ExecuteSimplifiedQueryDefinition">
 <Parameters>
  <parameter name="@Levels" type="integer" value="2" />
 </Parameters>
 <Relationships>
  <Item type="Part" qb:alias="Part" qb:select="id, item_number">
   <Relationships>
    <Item type="Part BOM" qb:alias="Part BOM" qb:select="id">
     <qb:fetch>
      <if>
       <condition>
        <match-path>
         <parameter name="@ExecutionPath" />
         <format-string format="QR1/(QR2/QR1){#0}/">
          <argument-value key="#0">
           <parameter name="@Levels" />
          </argument-value>
         </format-string>
        </match-path>
       </condition>
       <then>0</then>
      </if>
     </qb:fetch>
    </Item>
   </Relationships>
  </Item>
 </Relationships>
</Item>
```

```
<?xml version="1.0"?>
- <SOAP-ENV:Envelope xmlns:SOAP-ENV="http://schemas.xmlsoap.org/soap/envelope/">
  - <SOAP-ENV:Body>
    - <Result>
      - <Item type=:TopPart">
          <created_by_id keyed_name="Innovator Admin">30B991F927274FA3829655F50C99472E</created_by_id>
          <id keyed_name="part_1">5B5E6A6A639B4B0AAE95E0EE5E940A3B</id>
          <item_number>part_1</item_number>
        </Item>
      - <Item type="TopPart">
          <created_by_id keyed_name="Innovator Admin">30B991F927274FA3829655F50C99472E</created_by_id>
          <id keyed_name="part_2">F1C7326166D44130B12F33CC840975A5</id>
          <item_number>part_2</item_number>
        - <Relationships>
          - <Item type="PBom">
              <quantity>18</quantity>
            + <related_id keyed_name="part_7">
            </Item>
          - <Item type="PBom">
              <quantity>12</quantity>
            - <related_id keyed_name="part_3">
              - <Item type="RelPart">
                  <item_number>part_3</item_number>
                </Item>
              </related_id>
            </Item>
          - <Item type="PBom">
              <quantity>7</quantity>
            - <related_id keyed_name="part_4">
              - <Item type="RelPart">
                  <item_number>part_4</item_number>
                </Item>
              </related_id>
            </Item>
          </Relationships>
        </Item>
      - <Item type="TopPart">
          <created_by_keyed_name="Innovator Admin">30B991F92724FA3829655F50C99472E<created_by_id>
          <id keyed_name="part_3">10886AD522F24A3987AB34A22EDC7895</id>
          <item_number>part_3</item_number>
        - </Relationships>
          - <Item type="PBom">
              <quantity>11</quantity>
            - <related_id keyed_name="part_4">
              - <Item type="RelPart">
                  <item_number>part_4</item_number>
                </Item>
              </related_id>
            </Item>
          </Relationships>
        </Item>
```

```
1205d
  - <Item type="TopPart">
        <created_by_id keyed_name="Innovator Admin">30B991F927274FA3829655F50C99472E<created_by_id>
        <id keyed_name="part_5">84E0DD828849496DB6F86FBBA48E0F6D</id>
        <item_number>part_5</item_number>
    </Item>
1205e
  - <Item type="TopPart">
        <created_by_id keyed_name="Innovator Admin">30B991F927274FA3829655F50C99472E<created_by_id>
        <id keyed_name="part_6">ABFD8D1983634E59A2E66CF1C1610E4D</id>
        <item_number>part_6</item_number>
    </Item>
1205f
  - <Item type="TopPart">
        <created_by_id keyed_name="Innovator Admin">30B991F927274FA3829655F50C99472E<created_by_id>
        <id keyed_name="part_7">D68CFA6BB8424AFD98849DF99619DD35</id>
        <item_number>part_7</item_number>
    </Item>
1205g
  - <Item type="TopPart">
        <created_by_id keyed_name="Innovator Admin">30B991F927274FA3829655F50C99472E<created_by_id>
        <id keyed_name="part_8">654665D4E35143F1A372B4B477D6A656</id>
        <item_number>part_8</item_number>
    </Item>
  </Result>
 </SOAP-ENV:Body>
</SOAP-ENV:Envelope>
```

```xml
<AML>
<Item alias="Part">
    <id>ROOT_PART_ID</id>
    <Relationships>
        <Item alias="Part BOM">
            <id>PB_1</id>
            <Relationships>
                <Item alias="Part">
                    <id>REUSED_PART_ID</id>
                </Item>
            </Relationships>
        </Item>
        <Item alias="Part BOM">
            <id>PB_2</id>
            <Relationships>
                <Item alias="Part">
                    <id>REUSED_PART_ID</id>
                </Item>
            </Relationships>
        </Item>
        <Item alias="Part BOM">
            <id>PB_3</id>
            <Relationships>
                <Item alias="Part">
                    <id>NON_REUSED_PART_ID</id>
                    <Relationships>
                        <Item alias="Part BOM">
                            <id>PB_4</id>
                            <Relationships>
                                <Item alias="Part">
                                    <id>REUSED_PART_ID</id>
                                    <Relationships>
                                        <Item alias="Part Document">
                                            <id>PD_1</id>
                                        </Item>
                                    </Relationships>
                                </Item>
                            </Relationships>
                        </Item>
                    </Relationships>
                </Item>
            </Relationships>
        </Item>
    </Relationships>
</Item>
</AML>
```

```
<Result>
    <Item alias="Part">
        <id>ROOT_PART_ID</id>
        <QB_flat_id>0</QB_flat_id>
        <QB_flat_parent_ids></QB_flat_parent_ids>
    </Item>
    <Item alias="Part BOM">
        <id>PB_1</id>
        <QB_flat_id>1</QB_flat_id>
        <QB_flat_parent_ids>0</QB_flat_parent_ids>
    </Item>
    <Item alias="Part BOM">
        <id>PB_2</id>
        <QB_flat_id>2</QB_flat_id>
        <QB_flat_parent_ids>0</QB_flat_parent_ids>
    </Item>
    <Item alias="Part BOM">
        <id>PB_3</id>
        <QB_flat_id>3</QB_flat_id>
        <QB_flat_parent_ids>0</QB_flat_parent_ids>
    </Item>
    <Item alias="Part">
        <id>REUSED_PART_ID</id>
        <QB_flat_id>4</QB_flat_id>
        <QB_flat_parent_ids>1,2</QB_flat_parent_ids>
    </Item>
    <Item alias="Part">
        <id>NON_REUSED_PART_ID</id>
        <QB_flat_id>5</QB_flat_id>
        <QB_flat_parent_ids>3</QB_flat_parent_ids>
    </Item>
    <Item alias="Part BOM">
        <id>PB_4</id>
        <QB_flat_id>6</QB_flat_id>
        <QB_flat_parent_ids>5</QB_flat_parent_ids>
    </Item>
    <Item alias="Part">
        <id>REUSED_PART_ID</id>
        <QB_flat_id>7</QB_flat_id>
        <QB_flat_parent_ids>6</QB_flat_parent_ids>
    </Item>
    <Item alias="Part Document">
        <id>PD_1</id>
        <QB_flat_id>8</QB_flat_id>
        <QB_flat_parent_ids>7</QB_flat_parent_ids>
    </Item>
</Result>
```

QUERY ENGINE FOR RECURSIVE SEARCHES IN A SELF-DESCRIBING DATA SYSTEM

CROSS-REFERENCE TO RELATED APPLICATIONS

This application claims the benefit of U.S. Provisional Application Ser. No. 62/663,777 filed Apr. 27, 2018 titled "Query Engine for Recursive Searches in a Self-Describing Data System." The provisional application is incorporated by reference herein as if reproduced in full below.

TECHNICAL FIELD

This disclosure relates generally to search technology. More specifically, this disclosure relates to a query engine for recursive searches in a self-describing data system.

BACKGROUND

The technical challenges associated with implementing a search, or query functionality on data expressed in certain markup languages and stored in a database, in particular, a relational database, such as a .SQL server database include, without limitation, difficulty in formulating and executing recursive search queries as well as searching across a dynamic data model. Specifically, recursive searches of relational databases require iterative and repetitive reformulation of the search query. Further, certain markup languages do not support query functionality over across dynamic data models, as changes to the data model will block the execution of the search, typically resulting in an error message indicating that the database schema is different than an expected schema.

SUMMARY

This disclosure provides a query engine for recursive searches in a self-describing data system.

In a first embodiment, a method for performing recursive searching of items of a data structure having a data model includes creating an instance of a query definition, the instance of the query definition comprising a unique identifier, specifying one or more elements of the query definition, providing the query definition as an input to a query engine. The method further includes the operations of determining, by the query engine, query execution instructions based on the query definition, the query instructions specifying a recursive level-by-level search until a terminal node of the data structure is reached, obtaining results of a query executed based on the query execution instructions; and outputting query results.

In a second embodiment, a query engine includes a processor, a memory containing instructions, which when executed by the processor, cause the query engine to create an instance of a query definition, the instance of the query definition comprising a unique identifier, obtain one or more elements of the query definition, and provide the query definition as an input to the query engine. The instructions, when executed by the processor, further cause the query engine to determine query execution instructions based on the query definition, the query execution instructions specifying a recursive level-by-level search until a terminal node of the data structure is reached, obtain results of a query executed based on the query instructions; and output the query results.

In a third embodiment, a non-transitory computer-readable medium contains program code, which when executed by a processor, cause a query engine to create an instance of a query definition, the instance of the query definition comprising a unique identifier, obtain one or more elements of the query definition, and provide the query definition as an input to the query engine. The program code, when executed by the processor, further cause the query engine to determine query execution instructions based on the query definition, the query execution instructions specifying a recursive level-by-level search until a terminal node of the data structure is reached, obtain results of a query executed based on the query instructions, and output the query results.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1 illustrates an example of a tag creating an instance of an item in a self describing data system according to various embodiments of this disclosure;

FIG. 3 illustrates an example of a configuration document for an item according to certain embodiments of this disclosure;

FIGS. 7A and 7B illustrate an example of a configuration document setting forth the configuration of a query based on a self-describing data model according to certain embodiments of this disclosure;

FIG. 9 illustrates an example of a query configuration document comprising an instance of an item belonging to the query parameter item type which provides a user-defined filter on the query response data set;

FIG. 10 illustrates an embodiment of a query configuration document comprising an instance of an item belonging to the query parameter item type;

FIGS. 12A and 12B illustrate an example of a markup language document comprising query results obtained and outputted according to various embodiments of this disclosure;

FIGS. 14A and 14B illustrate query results outputted according to embodiments of this disclosure;

DETAILED DESCRIPTION

Figure 2:
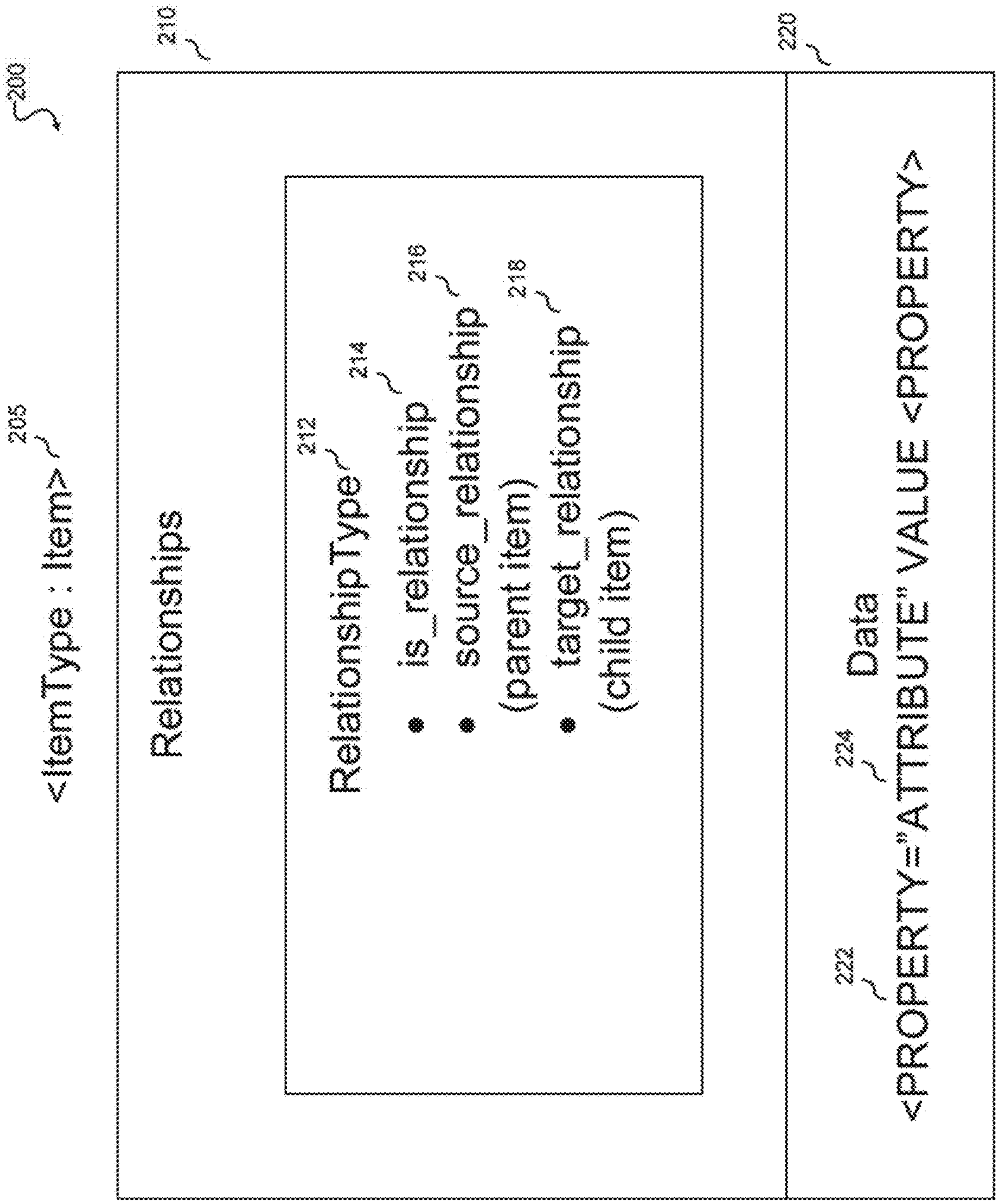
FIG. 2 illustrates, at a structural level aspects of the configuration of an item in a self-describing data system according to various embodiments of this disclosure.

FIGS. 1 through 16, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

FIG. 1 illustrates an example of an <item> tag 100 defining an instance of an item in a self-describing data system according to various embodiments of this disclosure.

According to certain embodiments, the foundational element of a self-describing data system is an item, instances of which may be maintained in persistent storage in a relational database. According to certain embodiments, the configuration and properties of an item may be expressed in a markup language, such as extensible markup language (XML), or Aras Markup Language (AML), which, as described in greater detail herein, follows a repeating "/Item/Relationships/Item/Relationships" pattern to describe item configurations.

Further, in the non-limiting example of FIG. 1, <item> tag 100 defines an instance of an item, which is in turn, an instance of an ItemType, which is itself an item. In this way, the instance of an item defined by <item> tag 100 belongs to a self-describing data system. Further, in some embodiments each ItemType has a relational table in the database, whose columns map to the property names of the ItemType.

According to various embodiments, the instance of the item defined by <item> tag 100 comprises three principal attributes, a type 105, an ID 110 and an action 115. It should be noted that the following three attributes are not the only attributes which can be applied to an item.

In the non-limiting example shown in FIG. 1, type 105 comprises an ItemType name for the instance of the item defined by <item> tag 100. According to certain embodiments, type 105 expresses an ItemType name for the item defined by <item> tag 100. In the non-limiting example of FIG. 1, the name of the item type is the string "Part." According to various embodiments, the namespace for the "type" attribute is extensible and can be dynamically changed, as new names for ItemTypes become necessary. For example, in some embodiments, the item defined by <item> tag 100 may be a piece of data associated with a manufacturing process. In such cases, additional names for ItemTypes, such as "BOM" (Bill of Materials) may become necessary.

According to various embodiments, ID 110 comprises a unique identifier for the instance of an item created by <item> tag 100. In the non-limiting example of FIG. 1, ID 110 comprises the string "ABCDEF012345." According to certain embodiments, ID 110 provides, without limitation, a primary key for the instance of the item for the purposes of providing query results.

In some embodiments, action 115 comprises a method to be applied to the instance of an item defined by <item> tag 100. In the non-limiting example of FIG. 1, the method specified by action 115 is a "get." The instance of an item type defined by <item> tag 100 may, in some embodiments, include one or more Relationship tags, from which a query may be constructed. According to various embodiments, the methods specified by action 115 may be implemented by an API, for example, an API implementing the Aras Innovator Object Model or Item Object Model.

FIG. 2 illustrates, at a structural level, aspects of the configuration 200 of an item in a self-describing data system according to various embodiments of this disclosure.

Referring to the non-limiting example of FIG. 2, the item described by configuration 200 may be initially defined by an <item> tag 205, which according to various embodiments, embodies the syntax and three principal attributes of <item> tag 100 shown in FIG. 1.

According to certain embodiments, the configuration 200 of an item may be expressed as a markup language document (for example, an AML document). In some embodiments, item 200's configuration may be expressed through an "/Item/Relationships/Item/Relationships" pattern in an AML document. Further, the document expressing the configuration 200 of the item may contain data 220 (which are themselves, items), structure or relationships 210 (which are hierarchical items) and logic, which, as shown in the example of FIG. 1, may be expressed through an action attribute (for example, action 115 shown in FIG. 1) of each item.

In the non-limiting example of FIG. 2, relationships 210 comprise hierarchical items. According to certain embodiments, an item's relationship to one or more other items may be expressed through a RelationshipType item 212. In some embodiments, wherein the document setting forth an item's configuration is written in AML, an instance of a RelationshipType item may be defined by using the <Relationships> tag, which is a container tag holding a set of relationship items.

As shown in FIG. 2, according to certain embodiments, the set of relationship items may comprise one or more of the following three properties, an is_relationship 214, a source_relationship 216 and a target_relationship 218.

In some embodiments, when the RelationshipType 212 is created, is_relationship 214 is also created. Is_relationship 214 comprises an item, and its id is the value of the relationship_id property of RelationshipType 212. As such, is_relationship 214 operates to provide an ItemType pairing to RelationshipType 212, and to define a RelationshipType rule and an ItemType for storing the source_relationship 216 and target_relationship 218 properties of the RelationshipType item 212.

According to certain embodiments, source_relationship 216 is a property of RelationshipType 212 which comprises a link pointing to a child item. Similarly, target_relationship 218 is a property of RelationshipType 212, which comprises a link to a child item.

As shown in the non-limiting example of FIG. 2, the configuration 200 of an item may further comprise data 220 expressed as values of properties, wherein the properties may further be specified by attributes.

According to certain embodiments, a property 222 defines data for an item. Examples of properties may include, for example, a cost for an item, which could be expressed in AML or XML in the form: "<cost>232.13</cost>" indicating that a particular item has a cost value of "232.13" units.

According to certain embodiments, items of data for an item may be further specified with an attribute 224, which may be analogized as metadata for the item or property, and controlling logic and methods associated with the item. For example, an attribute may define a conditional, producing an AML or XML expression of the form "<cost condition="between">10.00 and 50.00</cost>" In this example, the property "cost" is further specified through the "between" attribute for which the values 10.00 and 50.00 are specified.

According to certain embodiments, the configuration 200 for an item may further include history data for the item, showing some or all of the previous configurations of the item.

FIG. 3 illustrates an example of a configuration document 300 for an item according to certain embodiments of this disclosure. As shown in the non-limiting example of FIG. 3, an instance of an ItemType is declared through an initial <item> tag 305, which specifies that this instance of an item is of the "Part" type and is associated with an "add" method.

The properties 310 of the item are set forth, and include an "item_number" value (which, according to certain embodiments, may function as a unique identifier of the instance of the item) and a "description" value, which, in this case is "Some Assy" (an abbreviation of "some assembly.")

Container tag 315 specifies that the item has relationships, including a first relationship 320 with item indicating an "add" method with an item of the type "Part BOM." Item configuration 300 further specifies a "related_id" (e.g., child relationship between the "Part BOM" item and a child "part" item 325. Thus, by applying the "/Item/Relationships/Item/Relationships" pattern, a part-to-part BOM relationship may be described.

Figure 4:
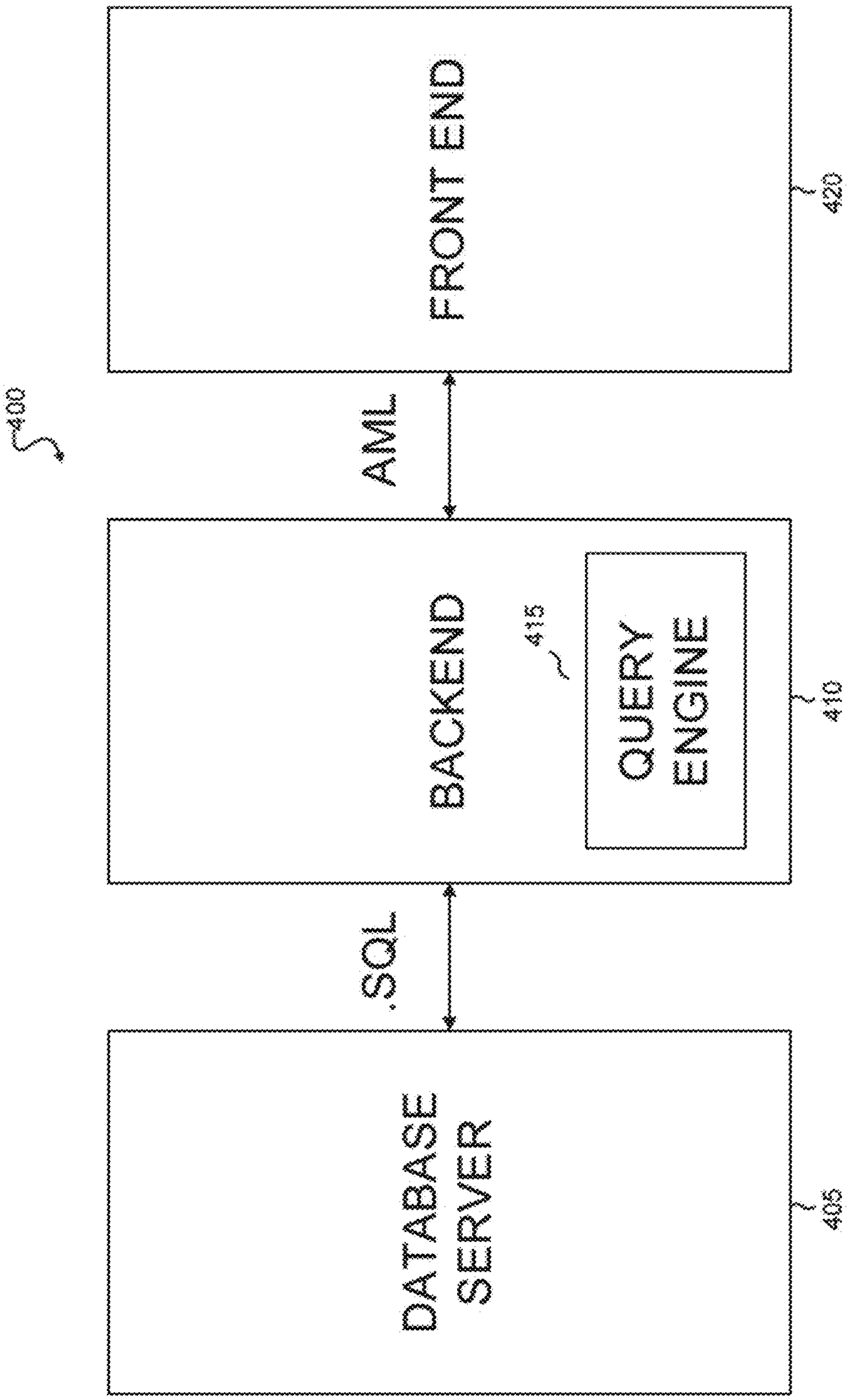
FIG. 4 illustrates an example of a system architecture for implementing a query engine for performing recursive searches in a self-describing data system according to various embodiments of this disclosure.

FIG. 4 illustrates an example of a system architecture 400 for implementing a query engine for performing recursive searches in a self-describing data system according to certain embodiments of this disclosure. In the non-limiting example of FIG. 4, network architecture comprises a database server 405, a backend server 410 implementing query engine 415, and a front end 420.

According to certain embodiments, database server 405 is a server hosting data and implementing one or more database applications supporting query functionalities. Database server 405 is generally platform-agnostic and may host data in a number of known database formats, including a relational database format (for example, by running an instance of .SQL server) or as a columnar database format. In the non-limiting example of FIG. 4, database server 405 is communicatively connected to backend 410. In some embodiments, this connection is provided over a network link, and in some other embodiments, backend 410 and database server 405 may be embodied on the same piece of hardware. Skilled artisans will appreciate that embodiments according to this disclosure may be implemented on a variety of hardware platforms.

According to certain embodiments, database server 405 is configured to receive queries expressed as statements in a domain-specific language (for example, structured query language), and return results from the database hosted on database server 405.

According to certain embodiments, backend 410 comprises a server or other computer configured to implement a query engine 415 configured to receive, from front end 420 query requests expressed in the syntax of a self-describing data system (for example, AML). As noted elsewhere, embodiments according to this disclosure are platform-agnostic and may be practiced across a wide range of hardware configurations and development environments. In some embodiments, query engine 415 may be implemented as an ASP.NET web service.

In the non-limiting example of FIG. 4, front end 420 is communicatively connected (for example, via a network or being embodied on the same piece of hardware) to backend 410. According to certain embodiments, front end 420 comprises a web client of a web service provided by backend 410, and provides a user interface (UI) through which queries can be input and query outputs displayed as a user. In certain embodiments, front end 420 may be constructed using modules from the HTML 5 DOJO toolkit. According to certain further embodiments, front end 420 may provide an interface through which users can configure parameters of queries and set permissions for queries.

Figure 5:
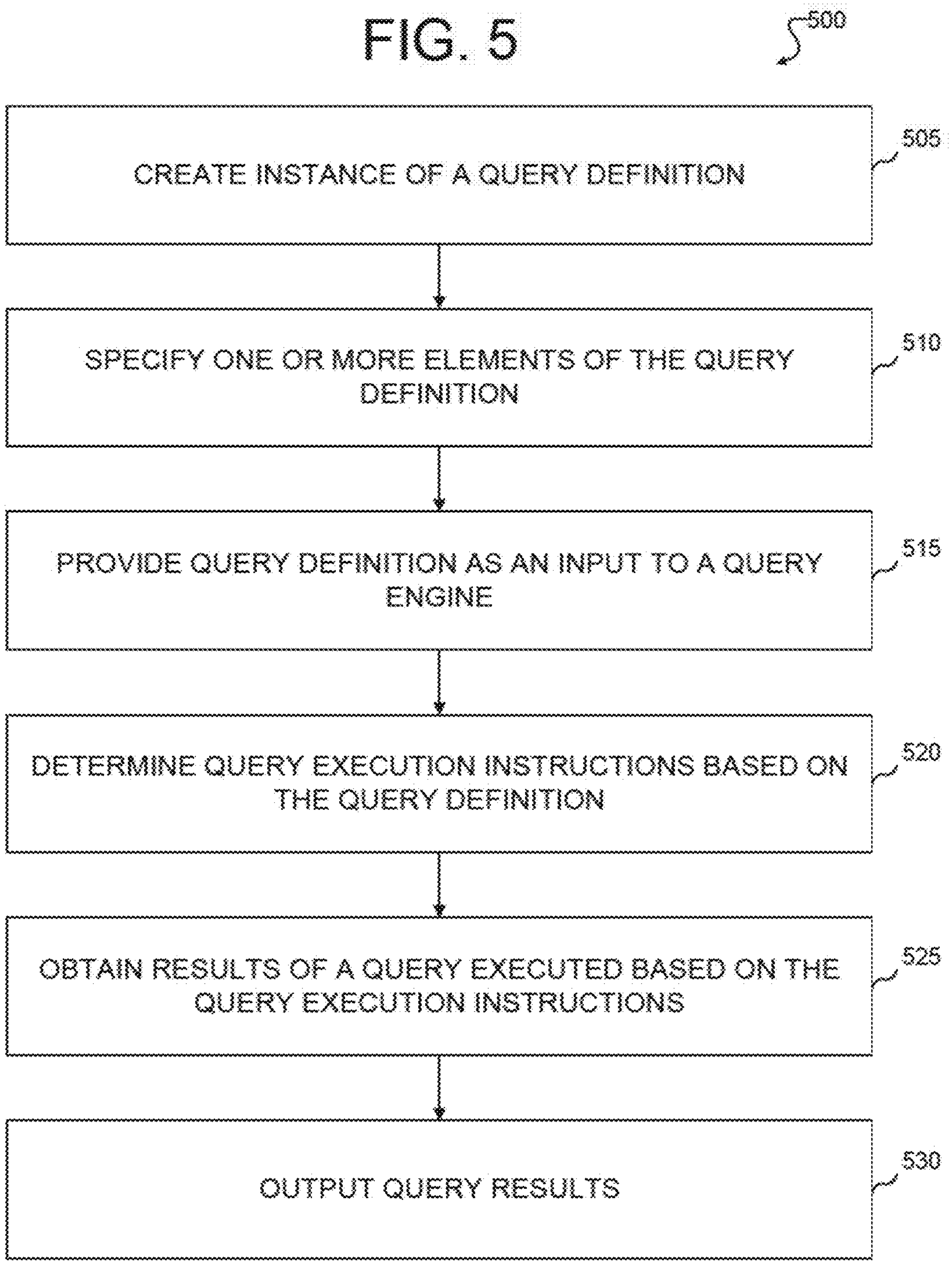
FIG. 5 illustrates operations of a query engine in one embodiment of a method for performing recursive searches in a self-describing data system.

FIG. 5 illustrates operations of a query engine in an example of a method 500 for performing recursive searches in a self-describing data system according to embodiments of this disclosure.

According to the non-limiting example of FIG. 5, method 500 includes operation 505, wherein the query engine creates an instance of a query definition. As discussed elsewhere in this disclosure, certain embodiments according to this disclosure utilize a self-describing data system, wherein the fundamental element of the data system is the item, which is an instance of an ItemType, which is, in turn, itself an item. Further, in certain self-describing data systems according to this disclosure, the configuration of items may be expressed through an "/Item/Relationships/Item/Relationships" pattern.

In some embodiments, a query definition is an item, and creating an instance of a query definition at operation 505 comprises beginning a markup language document (for example, an AML document) defining the configuration of the query definition. Further, a query definition may define the set of data (otherwise known as a domain) which a user is interested in seeing, and which can be collected across one or more different items types and/or relationships using user specified rules for filtering. Because a query definition defines the domain of a query, it may also be utilized to implement domain-based access controls to data items within the data structure.

According to certain embodiments, the AML document defining the configuration of the query begins with an instance of an <item> tag, an example of which is provided below:

<Item action="qry_Execute QueryDefinition" type="qry_QueryDefinition">

As shown above, according to some embodiments, an <item> tag creating an instance of a query definition specifies, at a minimum, a type of the instance of the query, which in this case, is a query definition (specified as "qry_QueryDefinition"), and a method, or action associated with the item, which in this case, is an instruction to execute a query, (specified as "qry_Execute Query Definition"). In some embodiments, the <item> tag creating the instance of the query definition item may further comprise a unique ID for the item, which in certain embodiments, may be advantageous if queries or query histories are stored in the data structure.

As shown in the non-limiting example of FIG. 5, method 500 includes operation 510, wherein the query builder, in response to a user input, specifies one or more elements of the query definition. According to certain embodiments, the one or more specified elements of the query definition may be specified as relationships, properties or attributes within the document providing the configuration of the query definition. Specifically, the one or more elements may be specified through additional items defining relationships or properties, including, without limitation, query items, query item selection properties, query item sort properties, query item available properties, query condition items and query reference items.

According to certain embodiments, method 500 includes operation 515, wherein the query definition is provided to a query engine. According to some embodiments, operations 505 and/or 510 may variously be performed at a front end client (for example, front end 420 shown in FIG. 4). According to other embodiments, operations 505 and/or 510 may be performed at the back end or programmatically at the query engine itself. According to certain embodiments, the query engine (for example, query engine 415 in FIG. 4) facilitates translating commands from a front end into query definitions, which are then converted into execution instructions to be passed to a database server (for example, database server 405 in FIG. 4). The query engine may further facilitate the construction of query definitions, and the provision of query results from the database server to the front end.

In some embodiments, method 500 also includes operation 520, wherein the query engine determines query execution instructions based on the received query definition. In the non-limiting example of FIG. 5, operation 520 comprises reading the query definition and translating it into a series of statements in the native language of the database server (for example, .SQL) and properly handling parameters defined within the query definition. As will be discussed further in this disclosure, as part of operation 520, the query engine may further specify an execution path for the query, as well as, where appropriate, recursion depths for recursive queries. In certain embodiments, the query execution instructions based on the query definition specify a recursive, level-by-level search of the data.

Additionally, in the non-limiting example of FIG. 5, the query execution instructions determined at operation 520 may be required to satisfy certain operational constraints, including without limitation, the ability to query a recursive structure, wherein a top level item is filtered by condition, while items from other levels are not filtered. Further, according to certain embodiments, querying a recursive structure must be performed without adding a "pseudo" top level item. Additionally, in certain embodiments, the execution instructions must enable a query of a recursive structure, wherein some intermediate level is filtered by a condition. Additionally, in some still further embodiments, the query execution instructions must enable limiting the depth of the retrieved structure, without modification of a recursive query topology.

According to various embodiments, at operation 525, the query engine obtains the results of a query executed based on the query execution instructions. According to certain embodiments, the results obtained at operation 525 may comprise generally unformatted data, and the query engine may assemble a response containing the results of the query.

In some embodiments, at operation 530, the query engine outputs the assembled query results. According to certain embodiments, operation 530 comprises returning the query response back to a user or application from which the request for a query was received (for example, front end 420 in FIG. 4). According to certain embodiments, the query results output at operation 530 may comprise a markup language document (for example, a document in XML, AML or some other extensible markup language dialect). According to other embodiments, at operation 530, the query engine may output query results as a flat output, a tree graph view or a graph visualization.

Figure 6:
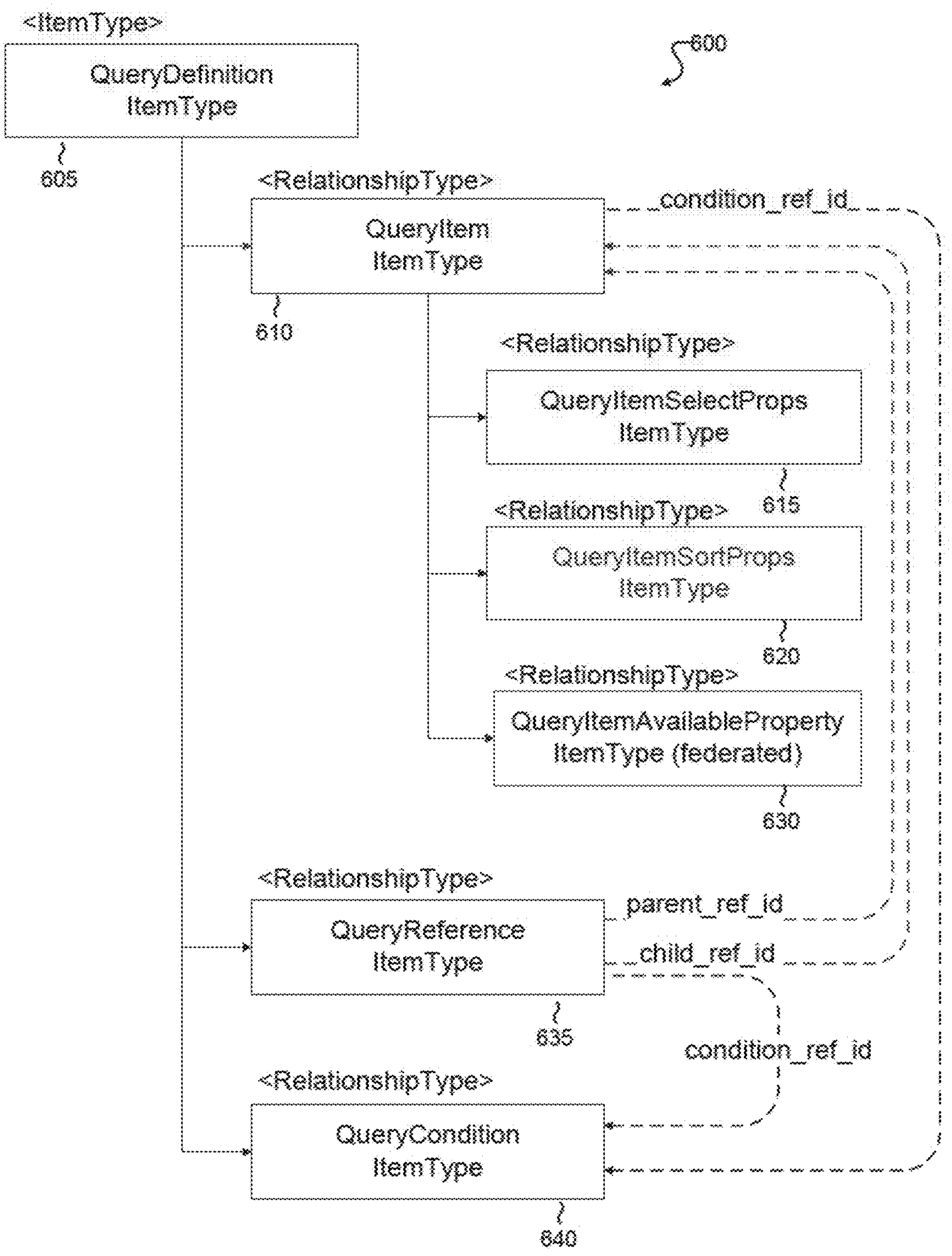
FIG. 6 illustrates, at a structural level, one example of a data model supporting a query definition item according to embodiments of this disclosure.

FIG. 6 illustrates, at a structural level, one example of a data model 600 supporting a query definition item according to embodiments of this disclosure. Note that, in this particular example, data model 600 comprises a hierarchical, tree like structure.

As shown in the non-limiting example of FIG. 6, data model 600 includes a query definition item 605, which occupies the top, or root level of the specified elements used to define a query. According to certain embodiments, query definition item 605 is an item of the "Query Definition" item type. Query Definition item 605 defines the set of data a user is interested in seeing. The data belonging to this set can be collected across one or more different Item Types using rules for filtering. Additionally, access controls can be implemented by defining additional filters excluding certain users from accessing (by including within the set of data encompassed by the user's query) data. According to certain embodiments, the properties of query definition item comprise a name, which can be a string specifying a unique name for the query definition. Additionally, the properties of query definition 605 can include a description, which can be a string or text describing the type of data represented by the query definition. Still further, the properties of the query definition can include a root query item id, which comprises a string representing the context item (also referred to as a root of the tree structure of data model 600) for query definition data model 600. According to other embodiments, properties of the query definition may include, without limitation, permissions.

According to certain embodiments, data model 600 is a self-describing data model which follows an "/Item/Relationship/Item/Relationship" description structure. Accordingly, in data model 600, a federated set of relationship properties 610 through 640 follow query definition 605. These relationships include query item 610. According to certain embodiments, query item 610 may appear as one or more <item> tags within a <relationship> container, such as shown in the example given in FIG. 3. Query item 610 is an item representing the source for properties, including properties to be selected and returned as part of the query response, and joins and filtering to be used, in the query definition. According to certain embodiments, the properties included in query item 610 include, without limitation, those set forth in Table 1 below:

TABLE 1

| Name | Label | Type | Description |
|---|---|---|---|
| classification | Classification | | Aggregation (GroupBy, SUM, AVG)<br>Union<br>Intersection<br>Special Join |
| itemtype | ItemType | Item | ItemType which is described by Query Item (Item or Relationship) |
| Alias | Alias | String | Alias of Query Item which will be used in joins and conditions. |
| condition_ref_id | Referenced Condition | String | Referenced Query Condition. |
| ref_id | Reference ID | String | Reference ID of Query Item |

As shown in the non-limiting example of FIG. 5, query item 610 may have source and target relationships (such as described with respect to relationships 210 in FIG. 2) with other relationships within data model 600. For example, query item 610 may have both a parent and a child relationship with a query reference 635. Similarly, query item 610 may also be indicated as either the source or the target of a relationship with query condition 640.

According to certain embodiments, the relationships specified by data model 600 comprise query item selection properties 615, which define or identify which properties from query item 610 to include in the query response. An overview of the properties in one example of query item selection properties 615 is set forth in Table 2, below:

TABLE 2

| Name | Label | Type | Description |
|---|---|---|---|
| property_ref_id | Property | String | Reference to qry_QueryItemAvailableProperty via ref_id value. |

In some embodiments, the relationships specified by data model comprise query item sort properties 620, which define which properties from the associated query item are to be used for sorting data returned by the query, and how the sort is to be performed. An overview of properties of query item sort properties 620 is set forth in Table 3, below:

TABLE 3

| Name | Label | Type | Description |
|---|---|---|---|
| property_ref_id | Property | String | Reference to qry_QueryItemAvailableProperty via ref_id value. |
| sort_order | Sort Order | Integer | Order of sorting |
| sort_order_direction | Sort Order Direction | List | Values: Ascending, Descending |

According to various embodiments, the relationships specified by data model 600 further comprise query item available properties 630. In the non-limiting example of FIG. 6, query item available properties 630 define which federated properties from the associated query item to include in the query response. An overview of properties of query item available properties 630 is set forth in Table 4, below:

TABLE 4

| Name | Label | Type | Description |
|---|---|---|---|
| source_id | | Item (qry_Queryitem) | Reference to qry_QueryItem |
| name | Name | String | |
| label | Label | ML String | |
| type | Type | List | Data Type of the QueryItem property |
| ref_id | Reference ID | String | Reference ID (GUID) |

In the non-limiting example of FIG. 6, the relationships specified data model 600 further comprise query reference 635, which, like the other relationships shown in FIG. 6, may be expressed as an instance of an item within the <relationship> container tag. According to certain embodiments, query reference 635 defines join requirements between query items within the query definition, and as such, implements controls over how data is collected and aggregated across query items within the query definition which have relationships with one another. As shown in TABLE 5, below, in some embodiments, query reference 635 operates to specify relationships between query items in an analogous manner as relationships 212 in FIG. 2. An overview of properties of query reference 635 is set forth in Table 6, below:

TABLE 6

| Name | Label | Type | Description |
|---|---|---|---|
| parent_ref_id | Parent Item | String | Referenced parent Query Item. |
| child_ref_id | Child Item | String | Referenced child Query Item. |
| condition_ref_id | Referenced Condition | String | Referenced Query Condition. |

According to certain embodiments, the relationships specified within query definition data model 600 comprise query condition 640. Query condition 640 is an instance of an item which defines the filter conditions for the data request. According to certain embodiments, the scope of query condition 640 is the entity on which it is referenced, and a query condition can be optionally associated with a query item and query reference items. In the case where query condition 640 is referenced by a query item (for example, query item 610), then query condition filters the items defined by the query item. If, however, the query condition is referenced by a query reference (for example, query reference 635), it operates to filter the items defined by a query item referenced as the child query item for the query reference. An overview of properties of query condition 640 is set forth in Table 7 below:

TABLE 7

| Name | Label | Type | Description |
|---|---|---|---|
| condition_xml | Condition Xml | Text | Xml representation of specified conditions. |
| ref_id | Reference ID | String | Reference ID of Query Condition. |

FIGS. 7A and 7B illustrate an example of a markup language configuration document 700 setting forth the configuration of a query constructed based on a self-describing data model (for example, data model 600 in FIG. 6) according to embodiments of this disclosure.

As shown in the non-limiting example of FIGS. 7A and 7B, configuration document 700 includes an <item> tag 705 creating an instance of the query definition, whose properties include the action or method "qry_ExecuteQueryDefinition."

Referring to the non-limiting example of FIGS. 7A and 7B, configuration document 700 further includes three query condition items 710*a*, 710*b* and 710*c* specifying filters to be applied in the query. In this particular example, the properties of each of query condition items 710*a* through 710*c* are further specified by attributes further controlling the execution logic of the query. For example, in query condition item 710, the <condition> attribute is used to define the filter, as shown by the statement "<![CDATA[<condition> <eq> <property ref-id="TopPart_id_GUID"/> <property ref-id="PBom_sourceId_GUID"/> </eq> </condition>]]>".

Configuration document 700 further includes query items 715*a*, 715*b* and 715*c* which, set forth properties to be part of the query response, and the properties to be used in joins and filtering. For example, query item 715*a* specifies an item, having the name "part" and the attribute "keyed_name," with the value "4F1AC04A2B484F3ABA4E20DB63808A88" as a filter for items to be returned by the query.

In the non-limiting example of FIGS. 7A and 7B, query document 700 further comprises query item selection properties 720*a*, 720*b*, 720*c* and 720*d*, which variously specify properties from query items 715*a* and 715*c* to include in the query response. For example, query item selection property 720*a* specifies the property "TopPart_id" as a property to be returned with query response items satisfying the filter criterion "keyed_name"="4F1AC04A2B484F3ABA4E20DB63808A88" specified by query item 715*a*.

Additionally, in this illustrative example, query document 700 further comprises an instance 725 of a query item sort property. In the non-limiting example of FIGS. 7A and 7B, instance 725 of a query item sort property specifies "TopPart_name" as the property to sort the items in the query response, and instance 725 of query item sort property includes the attribute "sort_order_direction" whose value "Ascending" indicates that the query response items are to be sorted by "TopPart_name" in ascending order.

As shown in the non-limiting example of FIGS. 7A and 7B, query document 700 further includes query reference items 730*a* and 730*b*, which specify how, in executing the query, data is collected and aggregated across query items which have relationships with other query items within the query definition. In this particular example, query reference items 730*a* and 730*b* specify join requirements, as shown, for example, by the property "<condition_ref_id>join_cond_1</condition_ref_id>" in query reference item 730*a*.

Figure 8:
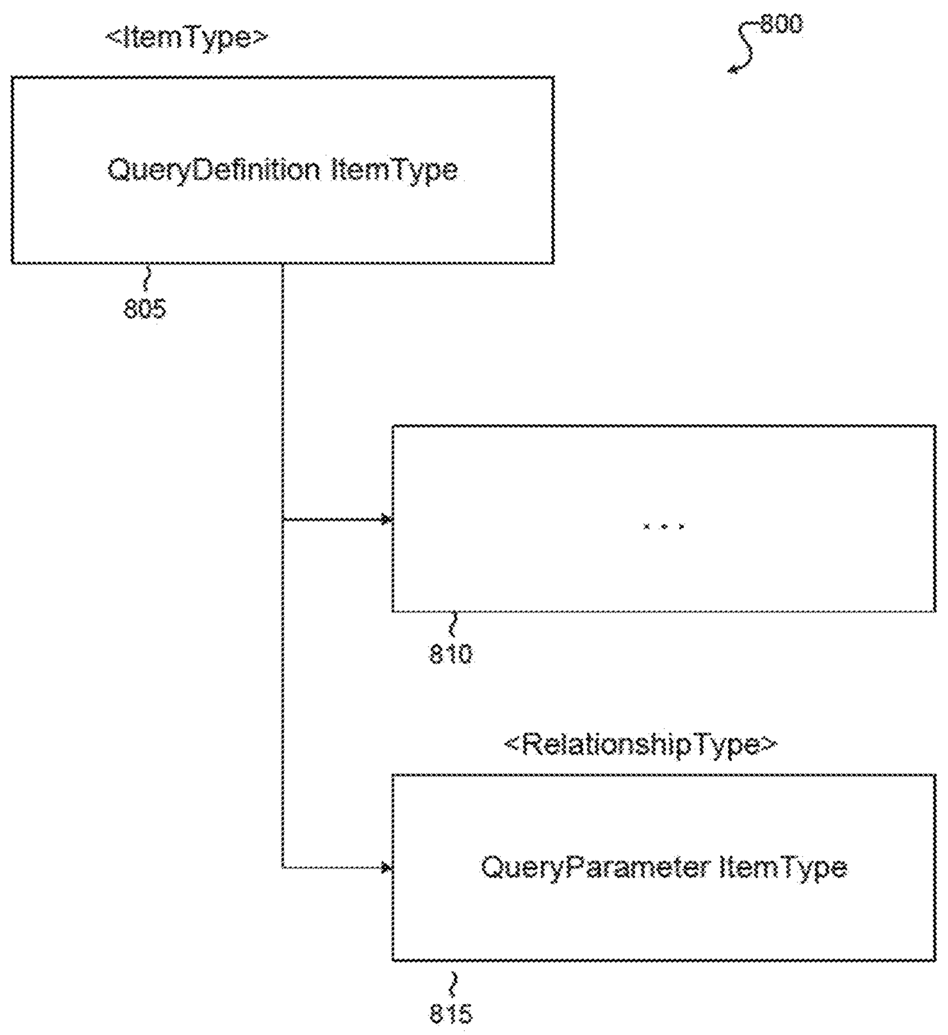
FIG. 8 at a structural level, an exemplary embodiment of an extension of a data model 800 for configuring recursive searches of a self-describing data system.

FIG. 8 illustrates, at a structural level, an exemplary embodiment of an extension of a data model 800 for configuring recursive searches of a self-describing data system.

In the non-limiting example of FIG. 8, data model 800 is represented as having a hierarchical tree structure, with query definition item 805 as the root, or context item type. Further, according to certain embodiments, data model 800 represents a query in a self-describing data system, whose elements follow a regular "/Item/Relationship/Item/Relationship" pattern.

Data model 800 may, according to various embodiments, include a variety of types of items 810 specifying relationships within the query definition. These items may comprise, for example, items 610-640 in FIG. 6, or a subset or superset thereof. Additionally, according to certain embodiments, data model 800 may further comprise items 815 belonging to the query parameter item type. According to various embodiments, query parameters comprise a user-defined parameter within query conditions which can be supplied at query execution time to override default values. Additionally, query parameters may also be used in other assignable values within a query definition, such as in offset and fetch values. The values for the parameters specified within the query parameter item may then be assigned at the time the query definition is to be executed.

Additionally, items 815 belonging to the query parameter item type may also be utilized to track or control aspects of the execution of a query. For example, according to certain embodiments, a user designed parameter "@ExecutionPath" is a dynamic parameter which may be calculated while processing a query definition to determine the progress of a query. Additionally, according to certain embodiments, items 815 belonging to the query parameter item type may also be used to define a query execution path, reflecting a route from a parent query item to a child query item in a query definition. Still further, items 815 belonging to the query parameter item type may be used to control the depth (i.e., how many levels are traversed) of recursion of a recursive query. According to some embodiments, a query engine (for example, query engine 415 in FIG. 4) will, by default and in the absence of a query parameter item specifying otherwise, exhaustively traverse all recursive paths.

FIG. 9 illustrates an embodiment of a query configuration document 900 comprising an instance of an item 905 belonging to the query parameter item type which provides a user-defined filter on the query response data set. As shown in the non-limiting example of FIG. 9, the container tag 907 "<Parameters>" signals the creation of the user-defined parameter having the name "@PartNumber," and the value "IN-0001." Further, as shown in FIG. 9, the parameter "@PartNumber" is specified as a filtering property 910 of a query response data set.

FIG. 10 illustrates an embodiment of a query configuration document 1000 comprising an instance 1005 of items belonging to the query parameter item type, by which the execution path of the query, in particular, the query recursion depth, may be controlled by defining a condition dependent on a value of the query parameter item. As shown in the non-limiting example of FIG. 10, an instance 1005 of the query parameter item defines the parameter named "@Levels," as being of an integer type. Once defined, the "@Level" parameter, in conjunction with the "@ExecutionPath" parameter is used as a value in conditional 1010, which determines the depth of the recursive query defined by query configuration document 1000.

Figure 11:
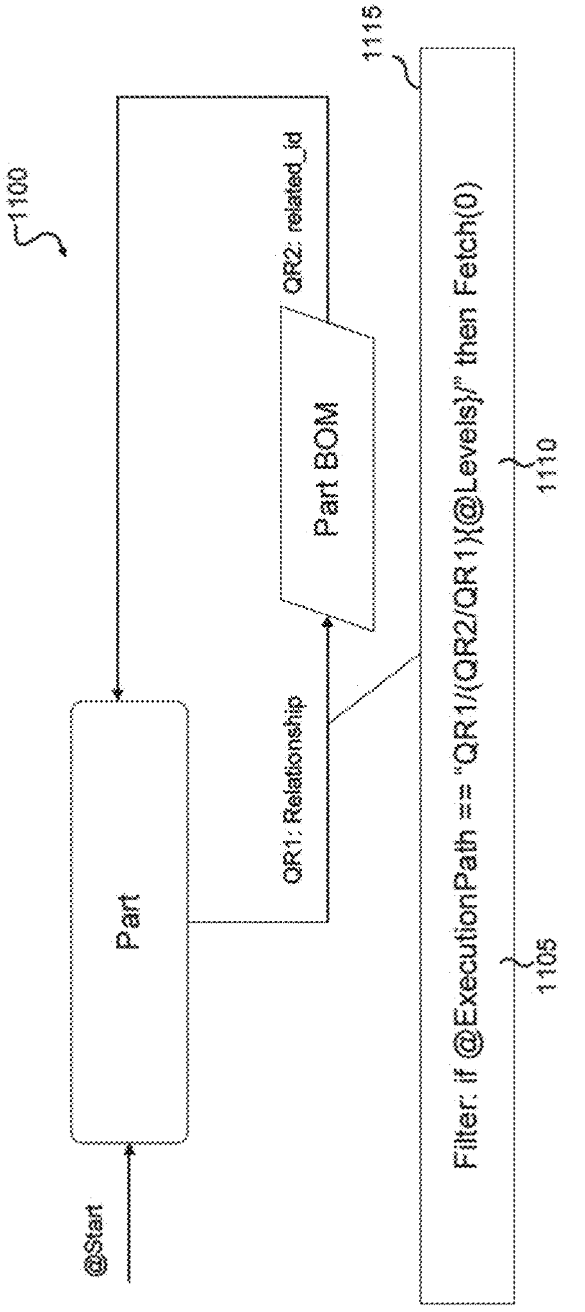
FIG. 11 illustrates, in wireframe format, an example of a query execution path for a query performed according to embodiments of this disclosure.

FIG. 11 illustrates, in wireframe format, a query execution path 1100 of a query (for example, the query described by query configuration document 1000 in FIG. 10). In the non-limiting example of FIG. 11, two items of the query parameter type are used to control query execution path. In this particular example, the first item 1105 of the query parameter type is the dynamic parameter "@ExecutionPath," and the second item 1110 of the query parameter type is the parameter "@Levels."

According to various embodiments, "@ExecutionPath" is a parameter calculated by a query execution engine (which according to certain embodiments, may be embodied as part of a query engine, such as, for example, query engine 415 in FIG. 4) tracking where the query execution engine is during the execution of a query definition. According to certain embodiments, query parameter "@ExecutionPath" is an item in a self-describing data system of the type "Path." In this particular example, the value of query parameter "@ExecutionPath" is a string reflecting a route from a parent query item (for example, query item 610 in FIG. 6) to a child query item via one or more query references (for example, query reference item 730$a$ in FIG. 7).

In some embodiments, the query parameter "@Levels" is a parameter specifying the number of levels to "drill down" in a recursive search. Thus, in the example of FIG. 11, the execution path of the query, specifically, the items which are fetched while executing the query, is defined by the filter 1115 "if @ ExecutionPath "QR1/(QR2/QR1){@Levels/}/" then Fetch(0)." In this non-limiting example, if the value of the parameter "@Levels" is zero, then the query pulls no items, because /QR1(/(QR2/QR1){0}/ is equal to "/QR1/" limiting the path of the "Part" query to "Part BOM." If "@Levels"=1, then the query "drills down" one level and fetches the root "Part." If "@Levels"=2, then the query "drills down" two levels, fetching the root "Part" and its children. Similarly, if "@Levels"=3, then the query "drills down" three levels within the hierarchy of the data structure, fetching the root "Part", its children and their children.

After an execution engine implements execution instructions based on the query definition, query engines according to certain embodiments of this disclosure obtain the results of the executed query and output the query results.

FIGS. 12A and 12B illustrate an example of a markup language document 1200 comprising query results obtained and outputted in a structured format. Specifically, markup language document 1200 comprises AML format results of the recursive query configured by query configuration document 700 shown in FIGS. 7A and 7B of this disclosure. According to certain embodiments, a query response, such as provided by document 1200 comprises the results of a query executed according to a query definition.

As shown in the non-limiting example of FIGS. 12A and 12B, query results 1200 mirror the "/Item/Relationship/Item/Relationship" structural pattern of the query definition and other documents constructed according to a self-describing data model. As shown in FIGS. 12A and 12B, the query returned results 1205$a$ through 1205$g$, which, as specified by query item selection property 720$c$ in FIG. 7 belong to the item type "Top Part." Further, as discussed elsewhere in this disclosure, in the absence of a query parameter item overriding a default recursion depth, the query was executed until a terminal node for each item in the query definition was reached, as shown by, for example, result 1205$b$.

According to certain embodiments, a query engine may output query results in a structured format, such as the structured format of the query definition (for example, as shown in FIGS. 12A and 12B) of this disclosure. According to certain other embodiments, the query engine may output results according to a different structural format, such as a graph visualization.

Figure 13:
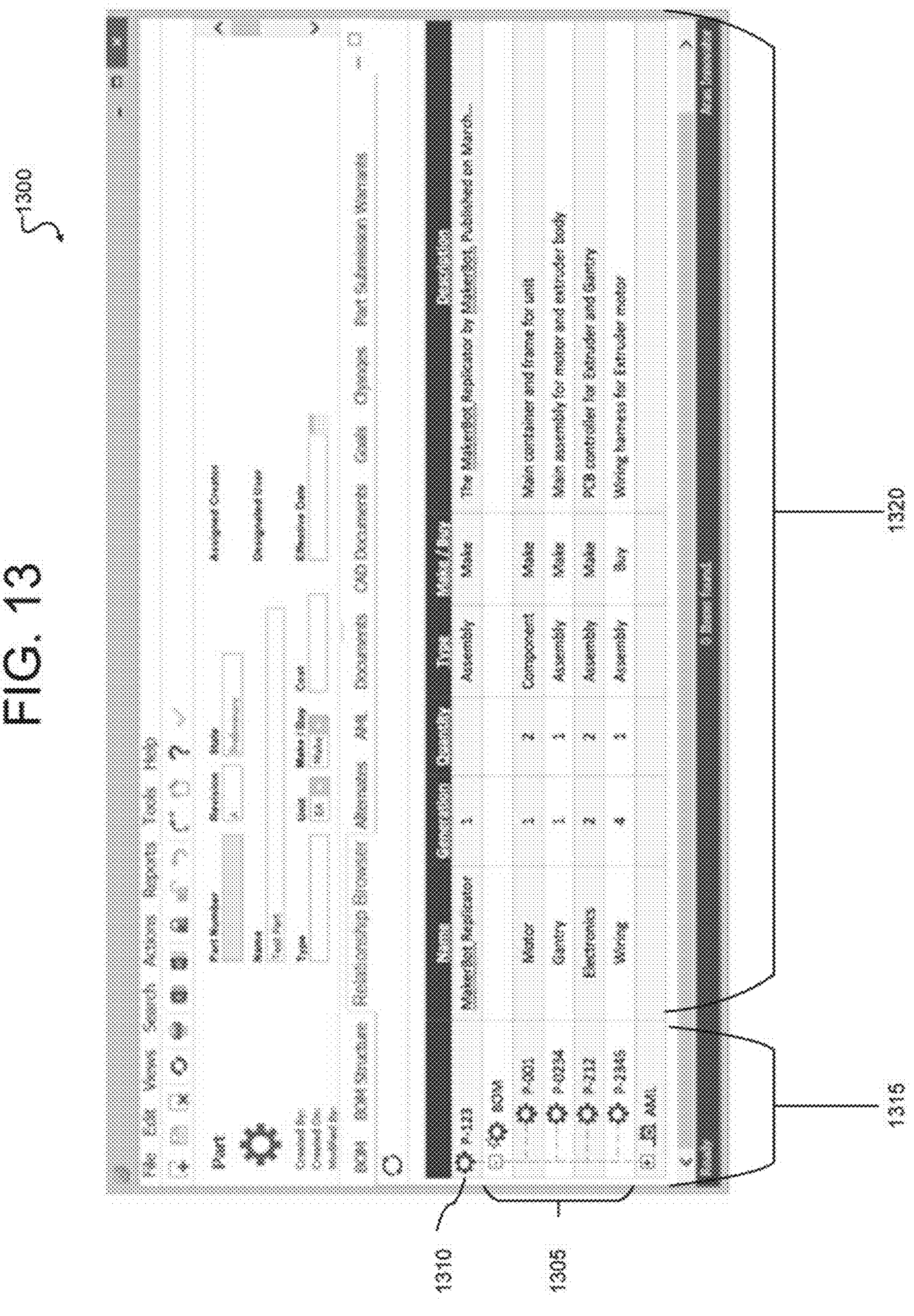
FIG. 13 illustrates of query results output in a tree grid format according to various embodiments of this disclosure.

As shown by FIG. 13, a query engine according to certain embodiments of this disclosure may output query results in a tree grid format. In the non-limiting example of FIG. 13, a view 1300 of a user interface (such as presented by front end 420 in FIG. 4) showing query results 1305 in a tree grid view. According to embodiments, the tree grid view enables the query results to be displayed in a way that reflects the structure of the query definition by which they were obtained. As such, according to certain embodiments, query result items are displayed in a hierarchical manner reflecting their relationship to a context item, or root node, and which displays the relationship between items obtained by the executed query. In this particular example, query results 1305 are shown according to their relationship to context item, or root node "P-123," which in this example, corresponds to a "MakerBot Replicator." According to certain embodiments, the leftmost column 1315 of the tree grid view indicates hierarchical (i.e., parent-child relationship between the displayed items), while the columns to the right 1320 indicate properties of the items returned by the executed query.

According to certain embodiments or under certain conditions (for example, when performing very, very large queries, such as queries of a bill of materials for a helicopter, which when expressed as items in a self-describing data structure, may comprise a data structure with ~30,000,000 item nodes) the performance of the query engine may be improved by outputting the query results in a "flat" or unstructured format. In contrast to certain structured output formats according to embodiments of this disclosure, wherein the query results are outputted in a manner that reflects and allows reconstruction of, the hierarchy and relationships within the query structure and query execution path, a "flat" output may adhere to a simplified structure, wherein only "key properties" are displayed. In this way, the file size of the query result may be made more manageable.

FIG. 14A illustrates an example of a query result set 1400 of an executed query which has been output in a structured format, in this case AML. In this non-limiting example, a significant portion of the output 1405 is dedicated to </Relationship> container tags for expressing the hierarchy of relationships between items in the result set.

FIG. 14B illustrates an example of a query result set 1410 for the same query as in FIG. 14A, which has been output in a flat format with "id" defined as a key property of the output. Skilled artisans will appreciate that result set 1405 may be more readily processed than result set 1400 in the absence of an extended hierarchy defined by multiple </Relationship> container tags 1405. Further, according to certain embodiments, query result set 1400 may be readily converted into a structured result by calling the "qry_ConvertFlatToStructuredResult" method of the Aras IOM API.

The functionality and performance of query engines according to embodiments of this disclosure may be further enhanced by through the use of extended classification items. Extending the data model of a self-describing data system through the use of extended classifications may enhance the ability of the query engine to perform queries of polyhierarchical relationships, equivalence and associative relationships. Further, extended classifications according to embodiments of this disclosure may enhance the operation of a query engine, by enabling users to add additional properties to an item, without changing the underlying item type of the item. In this way, searches across the additional properties may be conducted quickly, in that the result set will not necessarily include null classes for the item instances not having the newly added (or extended) properties.

According to certain embodiments, an extended classification encompasses a kind of item, defining a collection of properties, which are specific to an object classified by a term. Further, in some embodiments, an extended property comprises a property which exists on a global scope and which is not specific to any one item type. According to certain embodiments, extended properties may be defined via one or more extended classifications.

Figure 15:
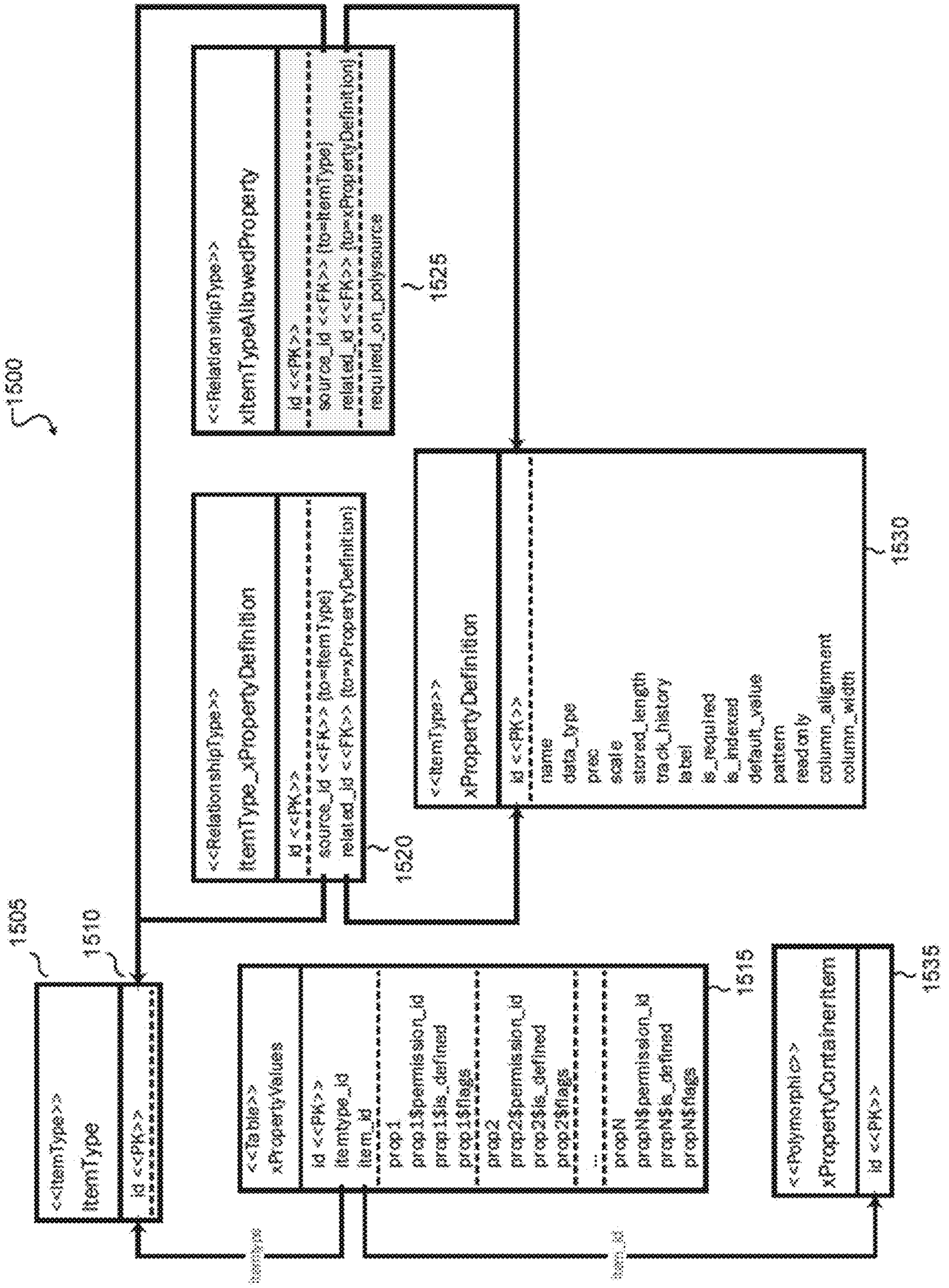
FIG. 15 illustrates a data model for implementing extended properties in a self-describing data system according to various embodiments of this disclosure.

FIG. 15 illustrates a data model 1500 for implementing extended properties in a self-describing data system according to various embodiments of this disclosure.

As shown in the non-limiting example of FIG. 15, data model 1500 is hierarchical and anchored, or rooted to an instance of an item type 1505, whose properties include an "id" value 1510 which operates as a primary key specifying relationships between instance of an item type 1505 and extended property items 1515-1535.

According to various embodiments, data model 1500 describes a self-describing system whose items follow an "/Item/Relationship/Item/Relationship" structural pattern. Further, data model 1500 comprises xPropertyDefinition ItemType 1530, which defines a property which is defined on a global scope and is not specific to any one item type. As shown in FIG. 15, xPropertyDefinition ItemType 1530 is a child of ItemType_xPropertyDefinition Relationship Type 1520. A list of properties supported by xProperty Definition ItemType 1530 is shown in TABLE 8 below:

TABLE 8

| Property Name | Label | Data Type |
|---|---|---|
| name | Name | string (32) |
| label | Label | ml_string |
| data_type | Data Type | list (Data Types) |
| data_source | Data Source | Item (ItemType) |
| stored_length | Length | integer |
| prec | Precision | integer |
| scale | Scale | integer |
| is_required | Required | boolean |
| is_indexed | Indexed | boolean |
| column_alignment | Alignment | list (Text Alignment) |
| column_width | Width | integer |
| default_value | Default Value | ml_string |
| pattern | Pattern | string (512) |
| readonly | Read Only | boolean |
| help_tooltip | Tooltip | ml_string |
| track_history | Track History | boolean |

According to certain embodiments, data model 1500 further comprises ItemType_xPropertyDefinition Relationship Type 1520, which describes a link between a particular ItemType and an xPropertyDefinition ItemType 1530. According to various embodiments, any xProperty Definition can be assigned to multiple ItemTypes and any ItemType may have multiple assigned)(Property definitions.

As shown in the non-limiting example of FIG. 15, data model 1500 may further comprise xItemTypeAllowedProperty Relationship Type 1525. According to certain embodiments, xItemTypeAllowedProperty Relationship Type 1525 describes a link between a particular ItemType and an xPropertyDefinition, which contains all allowed xProperties for the ItemType. As used in this disclosure, an allowed xProperty refers to an xProperty assigned to a particular ItemType, and which is the only xProperty which can be defined on Items of that particular ItemType.

According to certain embodiments, data model 1500 comprises xPropertyContainerItem 1535, which describes an ItemType which has at least one allowed xPropertyDefinition. When an xPropertyDefinition is assigned to this ItemType, this ItemType will be added to a list of polymorphic sources of xPropertyContainerItem 1535.

In some embodiments according to this disclosure, data model comprises a table of xPropertyValues 1515. As noted elsewhere in this disclosure, the implementation of extended classifications and extended properties enables properties to be dynamically added or removed from an instance of an ItemType without changing the type of the item. According to some embodiments, this may be accomplished by maintaining the values of the extended properties in a separate table from the items to which they relate.

Figure 16:
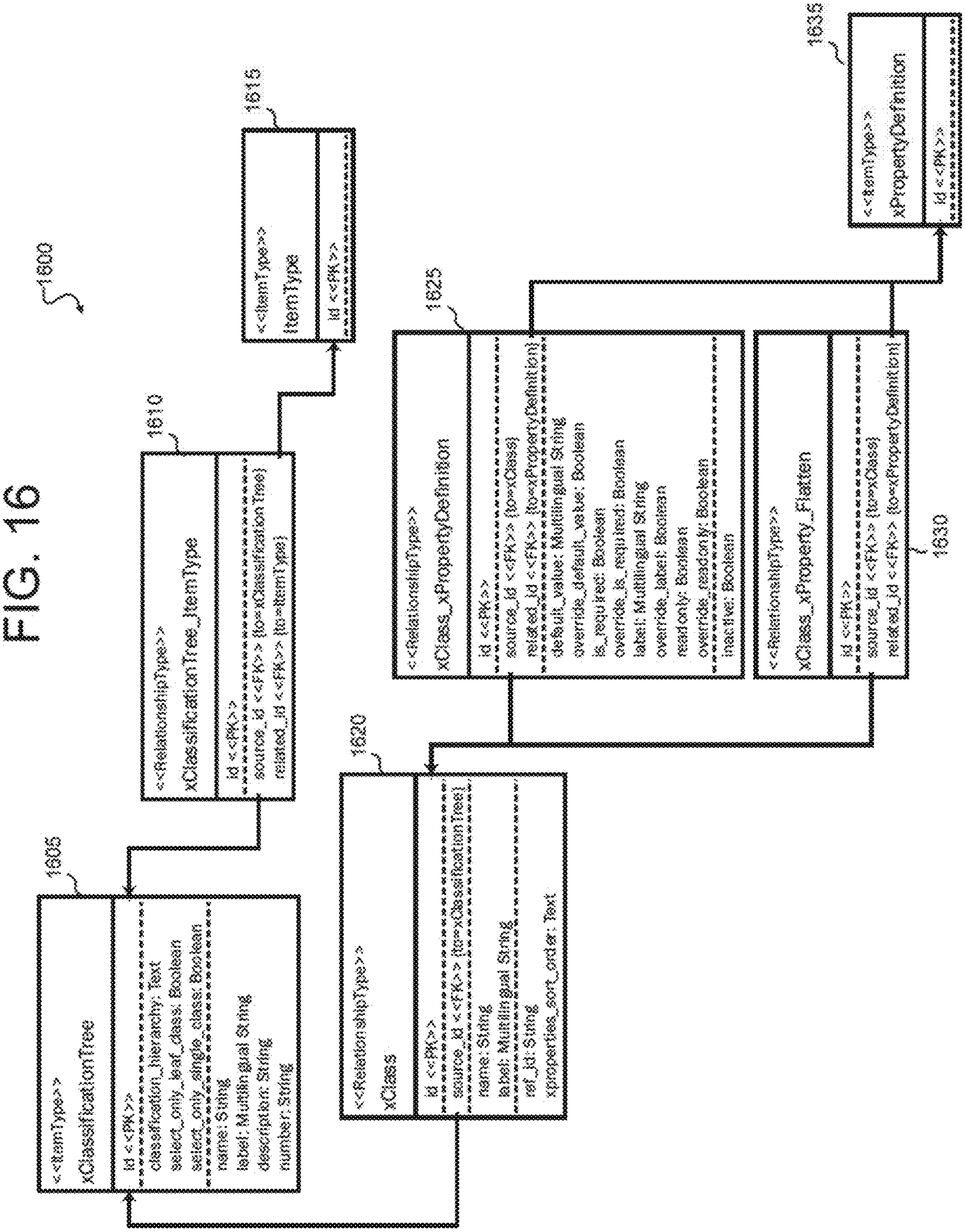
FIG. 16 illustrates an example of a data model for implementing extended classification according to embodiments of this disclosure.

As discussed elsewhere in this disclosure, an extended classification is a type of item which defines a collection of properties, which may be specific to an object classified by a term. FIG. 16 illustrates an example of a data model 1600 for implementing extended classification in a self-describing data system according to embodiments of this disclosure.

In the non-limiting example of FIG. 16, data model 1600 comprises, as its context item, or root, an instance of xClassificationTree ItemType 1605. According to embodiments, xClassificationTree ItemType 1605 defines a taxonomy, which is a collection of terms (also referred to as "xClasses," organized into a hierarchical structure. xClassificationTree ItemType 1605, is, according to certain embodiments, a self-contained unit which contains xClasses which are specific to only that tree. The properties of xClassficationTree ItemType 1605, according to certain embodiments are shown in Table 9, below:

TABLE 9

| Property Name | Label | Data Type |
|---|---|---|
| name | Name | string (32) |
| item_number | Number | string (32) |
| description | Description | text |
| classification_hierarchy | Classification Hierarchy | text |
| label | Label | ml_string |
| select_only_leaf_class | Restrict Selection to only Leaf Classes | boolean |
| select_only_single_class | Restrict Selection to a Single Class | boolean |

According to embodiments, data model 1600 may further comprise xClassificationTree_ItemType RelationshipType 1610, which defines a list of dimensions available for xClassificationTree ItemType 1605. xClassificationTree_ItemType RelationshipType 1610 may further be associated with one or more ItemTypes 1615.

In various embodiments according to this disclosure, data model 1600 may further comprise xClass Relationship Type 1620. As noted elsewhere instances of XClass represent a concept named by a term, which in turn define a collection of properties, further specified by xClass_XProperty Definition Relationship Type 1625.

In the non-limiting example of FIG. 16, data model 1600 includes xClass_xPropertyDefinition Relationship Type 1625, which describes a link between a particular xClass and an xPropertyDefinition.

Additionally, data model 1600 may further comprise instances of xClass_xProperty_Flatten Relationship Type 1630, which, describes a link between a particular xClass and xPropertyDefinition, and which contains all of the xProperties of a given xClass, including both the xClass's own properties and its inherited properties. According to some embodiments, a list of inherited properties may be calculated based on a hierarchy reflected in xClassificationTree ItemType 1605. As shown in the non-limiting example of FIG. 16, xClass_xPropertyDefinition Relationship Type 1625 and xClass_xProperty_Flatten Relationship Type 1630, are in turn, lied to at least one instance of xPropertyDefinition ItemType 1635.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for performing recursive searching of items of a data structure having a data model, the method comprising:

creating an instance of a query definition, the instance of the query definition comprising a unique identifier and defining a depth parameter having a name and a value that controls a depth of a recursive level-by-level search of the data structure;

specifying one or more elements of the query definition to be executed as instructions in a single query by a query engine, wherein the one or more elements comprise a query condition including a first dynamic parameter of an execution path comprising a string defining a search route from a parent query item to a child query item and the string references a key associated with the name of the depth parameter having the value that controls the depth of the recursive level-by-level search of the data structure, wherein the first dynamic parameter and the depth parameter are each a respective instance of an item in the data model, and wherein the depth parameter is configured in a configuration document that also configures the key and the string defining the search route from the parent query item to the child query item;

providing the query definition as an input to the query engine;

determining, by the query engine, query execution instructions based on the query definition, the query instructions specifying the recursive level-by-level search, the query engine further calculating the dynamic parameter and using the dynamic parameter with the depth parameter to control the recursive level-by-level search;

obtaining results of a query executed based on the query execution instructions; and outputting query results.

2. The method of claim 1, wherein outputting the query results comprises at least one of outputting the query results as a flat output, displaying the results in a tree grid view or displaying the results as a graph visualization.

3. The method of claim 1, wherein an element of the query definition is specified by a security rule.

4. The method of claim 1, wherein the data model of the data structure is at least one of a hierarchical data model, a dynamic data model or a self-describing data model.

5. The method of claim 1, wherein specifying the elements of the query definition comprises at least one of specifying a query item, a query item selection property, a query item sort property, a query item available property, or a query reference.

6. The method of claim 1, further comprising storing the query definition in the data structure.

7. The method of claim 1, wherein the query execution instructions specify at least one of traversing the data structure upwards or traversing the data structure downwards.

8. A query engine, comprising:

a processor;

a memory containing instructions, which when executed by the processor, cause the query engine to:

create an instance of a query definition, the instance of the query definition comprising a unique identifier and defining a depth parameter having a name and a value that controls a depth of a recursive level-by-level search of the data structure, obtain one or more elements of the query definition to be executed as instructions in a single query by the query engine, wherein the one or more elements comprise a query condition including a first dynamic parameter of an execution path comprising a string defining a search route from a parent query item to a child query item and the string references a key associated with the name of the depth parameter having the value that controls the depth of the recursive level-by-level search of the data structure, wherein the first dynamic parameter and the depth parameter are each a respective instance of an item in the data model, and wherein the depth parameter is configured in a configuration document that also configures the key and the string defining the search route from the parent query item to the child query item, provide the query definition as an input to the query engine, determine query execution instructions based on the query definition, the query execution instructions specifying the recursive level-by-level search, the query engine further calculating the dynamic parameter and using the dynamic parameter with the depth parameter to control the recursive level-by-level search;

obtain results of a query executed based on the query execution instructions, and output the query results.

9. The query engine of claim 8, wherein the memory contains instructions, which when executed by the processor, cause the query engine to output the query results as at least one of outputting the query results as a flat output, displaying the results in a tree grid view or displaying the results as a graph visualization.

10. The query engine of claim 8, wherein an element of the query definition is specified by a security rule.

11. The query engine of claim 8, wherein the data model of the data structure is at least one of a hierarchical data model, a dynamic data model or a self-describing data model.

12. The query engine of claim 8, wherein the elements of the query definition comprise at least one of a query item, a query item selection property, a query item sort property, a query item available property, or a query reference.

13. The query engine of claim 8, wherein the memory contains instructions, which when executed by the processor, cause the query engine to store the query definition in the data structure.

14. The query engine of claim 8, wherein the query execution instructions specify at least one of traversing the data structure upwards or traversing the data structure downwards.

15. A non-transitory computer-readable medium containing program code, which when executed by a processor, cause a query engine to:

create an instance of a query definition, the instance of the query definition comprising a unique identifier and defining a depth parameter having a name and a value that controls a depth of a recursive level-by-level search of the data structure, obtain one or more elements of the query definition to be executed as instructions in a single query by the query engine, wherein the one or more elements comprise a query condition including a first dynamic parameter of an execution path comprising a string defining a search route from a parent query item to a child query item and the string references a key associated with the name of the depth parameter having the value that controls the depth of the recursive level-by-level search of the data structure, wherein the first dynamic parameter and the depth parameter are each a respective instance of an item in the data model, and wherein the depth parameter is configured in a configuration document that also configures the key and the string defining the search route from the parent query item to the child query item, provide the query definition as an input to the query engine, determine query execution instructions based on the query definition, the query execution instructions specifying the recursive level-by-level search, the query engine further calculating the dynamic parameter and using the dynamic parameter with the depth parameter to control the recursive level-by-level search, obtain results of a query executed based on the query execution instructions, and output the query results.

16. The non-transitory computer-readable medium of claim 15, comprising program code, which when executed by the processor, cause the query engine to output the query results as at least one of outputting the query results as a flat output, displaying the results in a tree grid view or displaying the results as a graph visualization.

17. The non-transitory computer-readable medium of claim 15, wherein an element of the query definition is specified by a security rule.

18. The non-transitory computer-readable medium of claim 15, wherein the data model of the data structure is at least one of a hierarchical data model, a dynamic data model or a self-describing data model.

19. The non-transitory computer-readable medium of claim 15, the elements of the query definition comprise at least one of a query item, a query item selection property, a query item sort property, a query item available property, or a query reference.

20. The non-transitory computer-readable medium of claim 15, comprising program code, which when executed by the processor, causes the query engine to store the query definition in the data structure.

* * * * *